United States Patent
Zimmermann

[15] 3,674,994
[45] July 4, 1972

[54] METHOD AND APPARATUS FOR MULTIPLYING ANALOG ELECTRICAL QUANTITIES

[72] Inventor: Volker Zimmermann, Viernheim, Germany
[73] Assignee: Brown, Boveri & Cie., A.G., Mannheim-Kaferstal, Germany
[22] Filed: Nov. 24, 1969
[21] Appl. No.: 879,392

[52] U.S. Cl..................235/150.52, 235/150.51, 235/194, 307/229, 235/183
[51] Int. Cl..........................................G06g 7/16, G06j 1/00
[58] Field of Search............235/194, 195, 196, 183, 150.51, 235/150.52; 328/160, 161; 307/229, 230; 340/347, 347 A–347 D; 324/140, 141, 142

[56] References Cited

UNITED STATES PATENTS

| | | | |
|---|---|---|---|
| 3,157,783 | 11/1964 | Patchell et al. | 235/194 X |
| 3,322,942 | 5/1967 | Gerard et al. | 235/150.51 X |
| 3,466,460 | 9/1969 | Connolly | 235/194 X |
| 3,473,043 | 10/1969 | James | 235/194 X |
| 3,492,471 | 1/1970 | Crowell | 235/194 |

Primary Examiner—Joseph F. Ruggiero
Attorney—McGlew and Toren

[57] ABSTRACT

Apparatus for multiplying analog electrical quantities comprises an integrator, such as a Miller integrator, to whose input can be selectively applied two or more electrical quantities, in the form of positive voltages, or a reference voltage, which is a negative voltage. The output of the integrator is connected to a signal range indicator whose output is connected to the inverted input of an OR gate and to a logical control circuit connected to the output of a start generator. The logical control circuit is connected to the non-inverted input of the OR gate, and the OR gate is connected to one input of an AND gate whose other input has connected thereto a post generator. The output of the AND gate is connected to a counter whose counting direction is controlled by the logical control circuit, and the counter-output is connected to a digital indicator. To multiply the analog electrical quantities, the logical control circuit is activated to apply the first electrical quantity to the integrator and simultaneously to open the AND gate for transmission of a predetermined number of pulses from the pulse generator to the counter counting in the forward direction. After counting of the predetermined number of pulses, the first electrical quantity is disconnected at a first given time and the reference voltage is applied to the integrator while resetting the counter toward zero, until the voltage at the integrator output is zero at a second time. The reference voltage is then disconnected and a second electrical quantity is applied to the integrator while pulses are transmitted to the counter which is still counting in the backward direction, until the counter reading is zero. When the counter reading is zero, the second electrical quantity is disconnected at a third given time, the counter is set to count in the forward direction and the reference voltage is again applied to the integrator while the pulses are transmitted to the counter. The pulse count is then continued until the integrator output voltage is again zero.

10 Claims, 2 Drawing Figures

Inventor:
VOLKER ZIMMERMANN
BY
McGlew & Toren
ATTORNEYS

METHOD AND APPARATUS FOR MULTIPLYING ANALOG ELECTRICAL QUANTITIES

BACKGROUND OF THE INVENTION

In analog computers and digital computers the aim is to realize the basic mathematical operation of multiplying with a minimum expense. This is done, preferably, in a manner such that analog multiplying methods are use for analog computers and digital multiplying methods for digital computers. For certain applications, for example, for the numerical indication of products of analog quantities, it may be advisable, however, to provide neither a purely analog multiplying system nor a purely digital multiplying system.

Methods for multiplying electrical quantities, preferably voltages, have been known for a long time. One of the known methods is the so-called two-parabolas method which utilizes the fact that the product of two quantities can be represented by the difference of two square terms in which only sums or differences appear. This is disclosed, for example, by K. Steinbuch: "Taschenbuch der Nachrichtenverarbeitung" (Handbook of Message Processing) 2nd edition Berlin/Heidelberg/New York, 1967, p. 1136. A disadvantage of this method is that parabolic functions can be represented electrically only with relatively large expenditure.

Furthermore, it is known to use Hall generators for the multiplication of electrical quantities, as disclosed. For many purposes, however, the Hall-voltage is too low and the control current too high, so that complicated amplifier stages and the like, must be used.

Another possible arrangement for the analog multiplication of electrical quantities consists in providing two symmetrical transistors operated in the overmodulation range, with bases connected through resistances and with collectors connected through resistances, the factors being fed to the respective common point of the resistances, while the product can be read directly between the collectors. In this circuit arrangement, the resistance of the transistors must always be proportional to an electrical control quantity. But this is true in only a relatively limited range of the $I_c - U_{cE}$ characteristic of transistors, so that this method is applicable only to a limited extent.

SUMMARY OF THE INVENTION

This invention relates to the multiplication of analog electrical quantities and to the numerical indication of the product and, more particularly, to a new and improved method and apparatus therefor using a known analog-digital decoder and indicating the result numerically.

In accordance with the invention, the reference quantity is disconnected from an integrator when the output voltage of the integrator is zero and, instead, a second electrical quantity, which is in the form of a positive voltage, is connected to the integrator. The pulses of a pulse generator are transmitted to a pulse transmitter or counter, which is then switched to backward counting, until a zero reading appears in the counter. After this, the second electrical quantity is disconnected again at a given time, and the reference voltage is added. The counter counts from such given time the generated pulses until the output voltage of the integrator is again zero.

An object of the invention is to provide an improved method of multiplying analog electrical quantities and numerically indicating their product.

Another object of the invention is to provide an improved apparatus for performing this method.

A further object of the invention is to provide such a method and apparatus in which the multiplication and indication can be performed at a relatively small expense.

Another object of the invention is to provide such a method and apparatus using a known analog-digital decoder and indicating the result numerically. For an understanding of the principles of the invention, reference is made to the following description of a typical embodiment thereof as illustrated in the accompanying drawings.

DESCRIPTION OF THE PREFERRED EMBODIMENT

Figure 1:
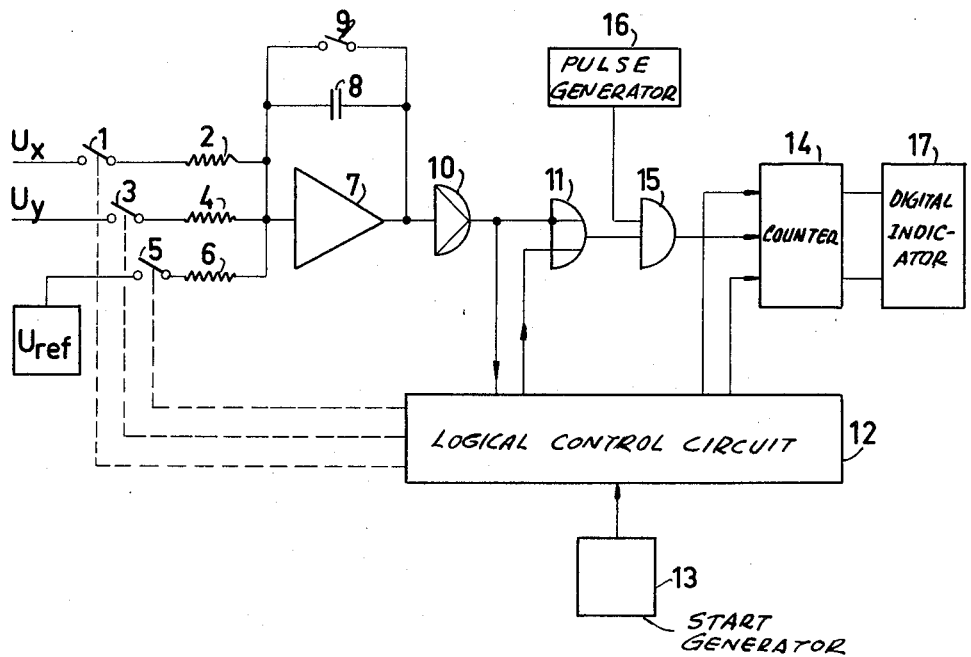
FIG. 1 is a block circuit diagram of a circuit arrangement embodying the invention.

Referring to FIG. 1, the two voltages to be multiplied with each other are designated $U_x$ and $U_y$, with the reference voltage being designated $U_{ref}$. Voltage $U_x$ is connectable, through a switch 1, to a resistance 2, while voltage $U_y$ is connected through a switch 3 to a resistance 4. Reference voltage $U_{ref}$ is connected through a switch 5 to resistance 6. Resistances 2, 4 and 6 are interconnected at their ends remote from the respective switches 1, 3 and 5, and the junction of the three resistances is connected to the input of an amplifier 7. A feedback branch extends from the common junction of resistances 2, 4 and 6 through amplifier 7, and has arranged therein a condenser 8 connected in parallel with a switch 9. In conjunction with condenser 8, amplifier 7 forms a so-called "Miller integrator."

The output of the integrator is connected to the input of a signal range indicator 10, whose output is, in turn, connected to the inverted input of an OR member 11. The second, non-inverted input of OR member 11 has applied thereto an output of a logical control circuit 12 which is connected with switches 1, 3 and 5, a start generator 13 and the inputs for the forward and backward counting of a counter 14. The output of OR member 11 is connected to one input of an AND member 15, whose second input is connected to a pulse generator 16. The output of AND member 15 is connected to counter 14, and counter 14 has several connecting lines extending to a digital indicator 17.

Figure 2:
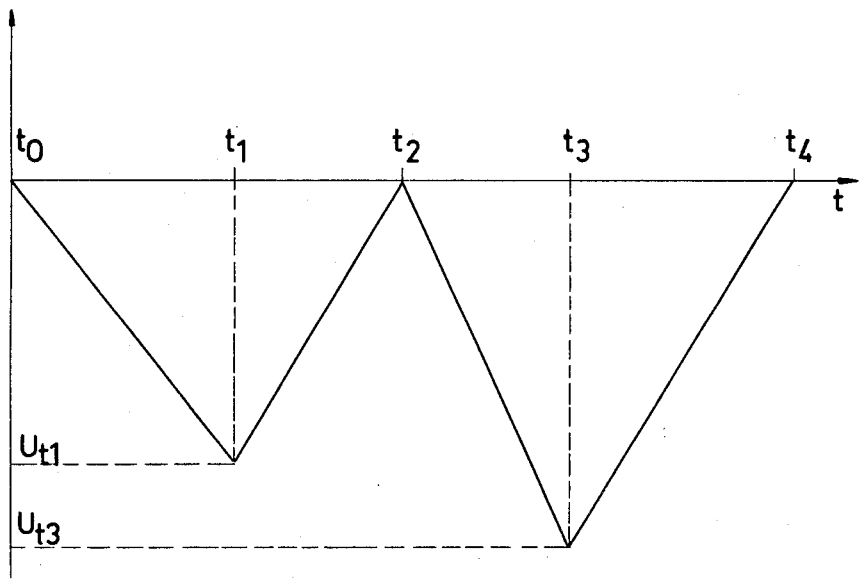
FIG. 2 is a graphical representation of the voltage at the output of a Miller integrator of the circuit arrangement shown in FIG. 1, with reference to time.

The beginning of the multiplication is started, with switch 9 open, by start generator 13 transmitting, at the time $t_0$ (FIG. 2), an impulse to logical control circuit 12. Logical control circuit 12 then acts to close switch 1 and to set counter 14 to zero. Thus, the positive voltage $U_x$ appears at the input of the Miller integrator. At the same time, the non-inverted input of OR member 11 is modulated by logical control circuit 12. A signal thus appears at the output of OR member 11, and is transmitted to the input of AND member 15. This has the effect that the pulses of pulse generator 16 arrive in counter 14.

After a given number $N_0$ of pulses, determined by logical control circuit 12, which are counted within the time $t_1$ (FIG. 2) in counter 14, switch 1 is re-opened. Thus, at the time $t_1$, there appears, at the output of Miller integrator 7–8, the voltage (a) $$U_{t1} = \frac{1}{T} \int_{t_0}^{t_1} U_x dt$$

In the above expression, T denotes the time constant of the Miller integrator. The arithmetic means of voltage $U_x$, within the time $t_1 - t_0$ is (b) $$\bar{U}_x = \frac{1}{t_1 - t_0} \int_{t_0}^{t_1} U_x dt$$

If $\bar{U}_x \cdot (t_1 - t_0)$ is substituted for $$\int_{t_0}^{t_1} U_x dt$$

in the equation (b) there results (c) $U_t = 1/T \cdot \bar{U}_x \cdot (t_1 - t_0)$ In cycle time $t_1 - t_0$ pulse generator 16 generates exactly $N_0$ pulses. The pulse time and the pulse interval determine the cycle of the pulses, so that it can be considered that the time $t_0$ $-t_1$ is subdivided into $N_o$ cycles of the duration $T_o$. From this there results (d) $\quad t_1 - t_o = N_o \cdot T_o$ which, substituted in equation (c), yields, for the voltage at the output of the Miller integrator at the time $t_1$ (e) $\quad U_{t_1} = 1/T \, U_o \cdot N_o \cdot T_o$ At the time $t_1$, not only is switch 1 opened, but switch 5 is closed, so that negative reference voltage $U_{ref}$ arrives at the input of the Miller integrator. In addition, the non-negated input of OR member 11 has supplied thereto an "0" signal. A signal can now arrive in AND member 15 through OR member 11 only if an "0" signal appears at the output of signal range indicator 10. Since the signal range indicator 10 yields an "0" signal only with an input voltage of zero volts, OR member 11 emits only an "L" signal at the time $t_2$. The time $t_2$, at which the input voltage has dropped to zero volts, is determined by the sum of the upward integration time and of the downward integration time started by the negative reference voltage $U_{ref}$.

During the time $t_1$, $N_o$ pulses have been counted in counter 14, as mentioned above. After these $N_o$ pulses, counter 14 starts to count again from zero, that is, it counts now the $N_1$ pulses generated in the time $t_2 - t_1$. Since the voltage at the output of the Miller integrator extends from the time $t_1$ according to the equation (f) $\quad U_{(t)} = U_{t_1} + \dfrac{1}{T} \int -U_{ref} \, dt$ that is, (g) $\quad U_{(t)} = \dfrac{N_o \cdot T_o \cdot \bar{U}_x}{T} + \dfrac{1}{T} \int -U_{ref} \, dt$ the following equation applies for the time $t_2$ (h) $\quad 0 = \dfrac{N_o \cdot T_o \cdot \bar{U}_x}{T} + \dfrac{1}{T} \int_{t_1}^{t_2} (-U_{ref}) \, dt$ from this there follows, for $U_{ref} = \text{const.}$, (i) $\quad \dfrac{N_o \cdot T_o \cdot \bar{U}_x}{T} = \dfrac{1}{T} U_{ref}(t_2 - t_1) = \dfrac{1}{T} \cdot U_{ref} N_1 \cdot T_o$ and thus, for the number of pulses emitted in the time $t_2 - t_1$ by pulse generator 16

(j) $\quad N_1 = N_o \cdot \dfrac{\bar{U}_x}{U_{ref}}$

If signal range indicator 10 responds at the time $t_2$, it transmit a signal to logical control circuit 12 which, in turn, opens switch 5 and closes switch 3. The second factor of the multiplication is thus transmitted, in the form of voltage $U_y$, to the input of the Miller integrator. At the same time, logical control circuit 12 applies an "L" signal to the input of counter 14, determining the backward counting direction. Voltage $U_y$ is now integrated upwardly until the number $N_1$ in counter 14 has been counted down to zero. At the counter reading zero at time $t_3$, the voltage at the output of the integrator has the value (k) $\quad U_{t_3} = \dfrac{1}{T} \int_{t_2}^{t_3} U_y \, dt = \dfrac{N_1 T_o U_y}{T}$ At the time $t_3$, logical control circuit 12 opens switch 3 and closes switch 5. At the same time, the input of counter 14 determining the forward counting direction receives, from logical control circuit 12, an "L" signal. The negative reference voltage $U_{ref}$ applied to the Miller integrator again reduces the voltage $U_{t_3}$. This is completed after the time $t_4 - t_3$, while counter 14 counts $N_2$ pulses. For the voltage at the output of the integrator there applies, at time $t_4$, (l) $\quad 0 = \dfrac{N_1 T_o U_y}{T} + \dfrac{1}{T} \int_{t_3}^{t_4} -U_{ref} \, dt$ From this there follows (m) $\quad \dfrac{N_1 T_o \bar{U}_y}{T} = \dfrac{1}{T} U_{ref} N_2 T_o$ or $N_2 = N_1 \, \bar{U}_y / U_{ref}$.

If the value for $N_1$ from equation (j) is substituted in this equation, there is obtained, for the number of pulses counted in counter 14, (n) $\quad N_2 = N_o \dfrac{\bar{U}_x}{U_{ref}} \cdot \dfrac{\bar{U}_y}{U_{ref}}$ or (o) $\quad N_2 = \text{const.} \cdot \bar{U}_x \cdot \bar{U}_y$ That is, the last indicated number of pulses is proportional to the product of the two electrical input quantities. At the time $t_4$, signal range indicator 10 responds and causes logical control circuit 12 to close switch 9 and thus prevent a reversal of the polarity of the output voltage of the Miller integrator. Since both inputs of OR member 11 now have an "0" signal, no additional pulses can arrive in counter 14. The number of pulses contained in counter 14 is indicated by means of indicator 17.

The above described arrangement is suitable also for measuring the apparent and real power of alternating quantities. In the measurement of the apparent power, DC voltages must be derived, in a known manner, from the voltage to be measured and from the current to be measured, and these DC voltages are proportional to the effective voltage and current values, respectively.

In the measurement of the real power, DC voltages must be derived, in a known manner, from the voltage to be measured and from the current to be measured, and these DC voltages must be proportional to the effective value of the voltage and to the product of the effective value of the current and the cosine of the phase angle. The DC voltages thus obtained are then transmitted, as input voltages $U_x$ and $U_y$, respectively, to the above described circuit arrangement for multiplying electrical quantities.

Naturally, it is possible also to multiply more than two factors with the method described above. To this end, the voltage for the duration of $N_2$ pulses, proportional to the third factor, would have to be applied to the input of the integrator. Then the reference voltage is again applied to the input of the integrator, etc.

The advantages of the invention consist particularly in that the product of two analog quantities can be indicated directly numerically by using a known analog-digital decoder.

While a specific embodiment of the invention has been shown and described in detail to illustrate the application of the principles of the invention, it will be understood that the invention may be embodied otherwise without departing from such principles.

What is claimed is:

1. A method of multiplying analog electrical quantities and numerically indicating the products comprising the steps of activating a logical control circuit to apply a first electrical quantity, in the form of a positive voltage, to the input of an integrator, and simultaneously to open an AND gate for transmission therethrough of a predetermined number $N_o$ of pulses from a pulse generator to a counter counting in the forward direction; after counting of $N_o$ pulses, disconnecting the first electrical quantity from the integrator at a first given time; applying a reference voltage, in the form of a negative voltage, to the integrator, while resetting the counter toward zero, until the voltage at the integrator output is zero at a second time; disconnecting the reference voltage from the integrator when the integrator output voltage is zero and applying a second electrical quantity, in the form of a positive voltage, to the input of the integrator while transmitting pulses from the pulse generator to the counter, still counting in the backward direction, until the counter reading is zero; when the counter reading is zero, disconnecting the second electrical quantity from the integrator at a third given time, setting the counter to count in the forward direction and again applying the reference voltage to the integrator while continuing transmission of pulses to the counter; and continuing to count the pulses until the integrator output voltage is again zero.

2. A method of multiplying analog electrical quantities and numerically indicating the products, as claimed in claim 1, including the step of, when the integrator output voltage is again zero, numerically indicating the number of pulses then contained in the counter.

3. A method of multiplying analog electrical quantities and numerically indicating the products, as claimed in claim 1, including the step of, after the integrator output voltage is again zero, shorting the integrator to prevent reversal of the polarity of the integrator output voltage.

4. Apparatus for multiplying analog electrical quantities and numerically indicating the products comprising, in combination, and integrator having an input and an output; switch means selectively operable to apply, to the input of said integrator, the analog electrical quantities to be multiplied, in the form of positive voltages, and a reference quantity, in the form of a negative voltage; a logical control circuit controlling selective operation of said switch means; a signal range indicator connected in series with the output of said integrator; an OR member having a negated input and a non-negated input; means connecting the output of said signal range indicator to the negated input of said OR member; means connecting the non-negated input of said OR member to said logical control circuit; a counter; means connecting the output of said OR member to said counter; and a digital indicator connected to the output of said counter; said logical control circuit operating said switch means in a preselected sequence to apply said positive voltages and said negative voltage alternately to the input of said integrator in accordance with the output voltage of said integrator and the reading of said counter.

5. Apparatus for multiplying analog electrical quantities and numerically indicating the products, as claimed in claim 4, in which the output of said OR member is connected to one input of an AND member constituting said means connecting said OR member to said counter; and a pulse generator connected to another input of said AND member.

6. Apparatus for multiplying analog electrical quantities and numerically indicating the products, as claimed in claim 5, including means connecting said logical control circuit to said counter to selectively control the counting direction of said counter.

7. Apparatus for multiplying analog electrical quantities and numerically indicating the products, as claimed in claim 6, including means connecting the output of said signal range indicator to an input of said logical control circuit.

8. Apparatus for multiplying analog electrical quantities and numerically indicating the products, as claimed in claim 7, including a start generator connected to said logical control circuit to initiate activation of said logical control circuit.

9. Apparatus for multiplying analog electrical quantities and numerically indicating the products, as claimed in claim 4, in which said switch means comprises an individual switch for applying each respective positive voltage and said negative voltage to the input of said integrator; and a respective resistance connected between each individual switch and the input of said integrator, the terminals of said resistances remote from the associated individual switches being interconnected at a common junction point connected to the input of said integrator.

10. The method of multiplying analog electrical quantities, comprising the steps of integrating a first electrical quantity over a predetermined time period to establish a first electrical variation range from beginning to the end of the period, integrating a reference quantity and measuring the time needed to vary the integrated output over the first electrical variation range, integrating a second electrical quantity to be multiplied with the first electrical quantity over the measured time to establish a second electrical variation range, and integrating the reference quantity and measuring the time needed to vary the integrated output over the second electrical range.

* * * * *